Patented Sept. 29, 1925.

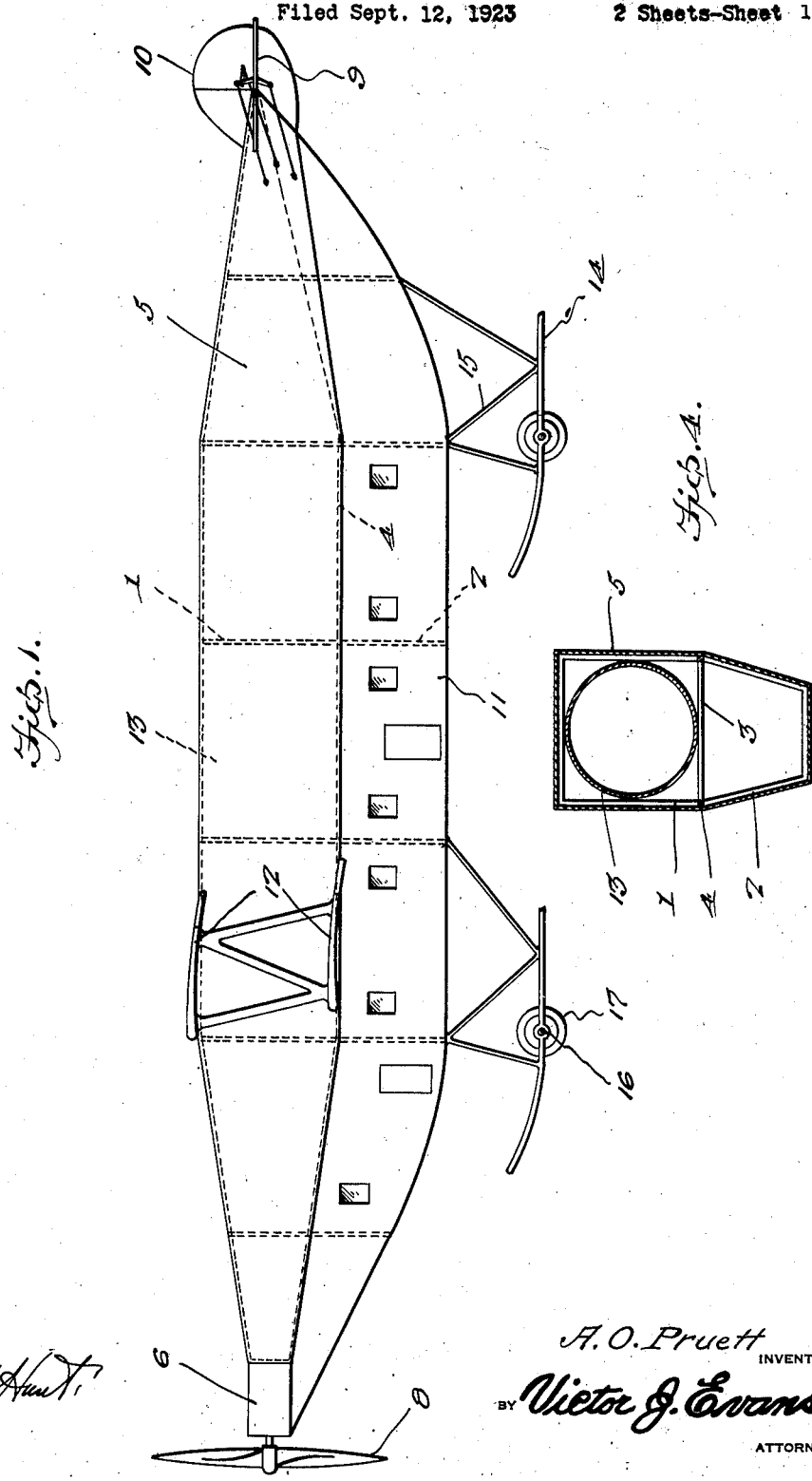

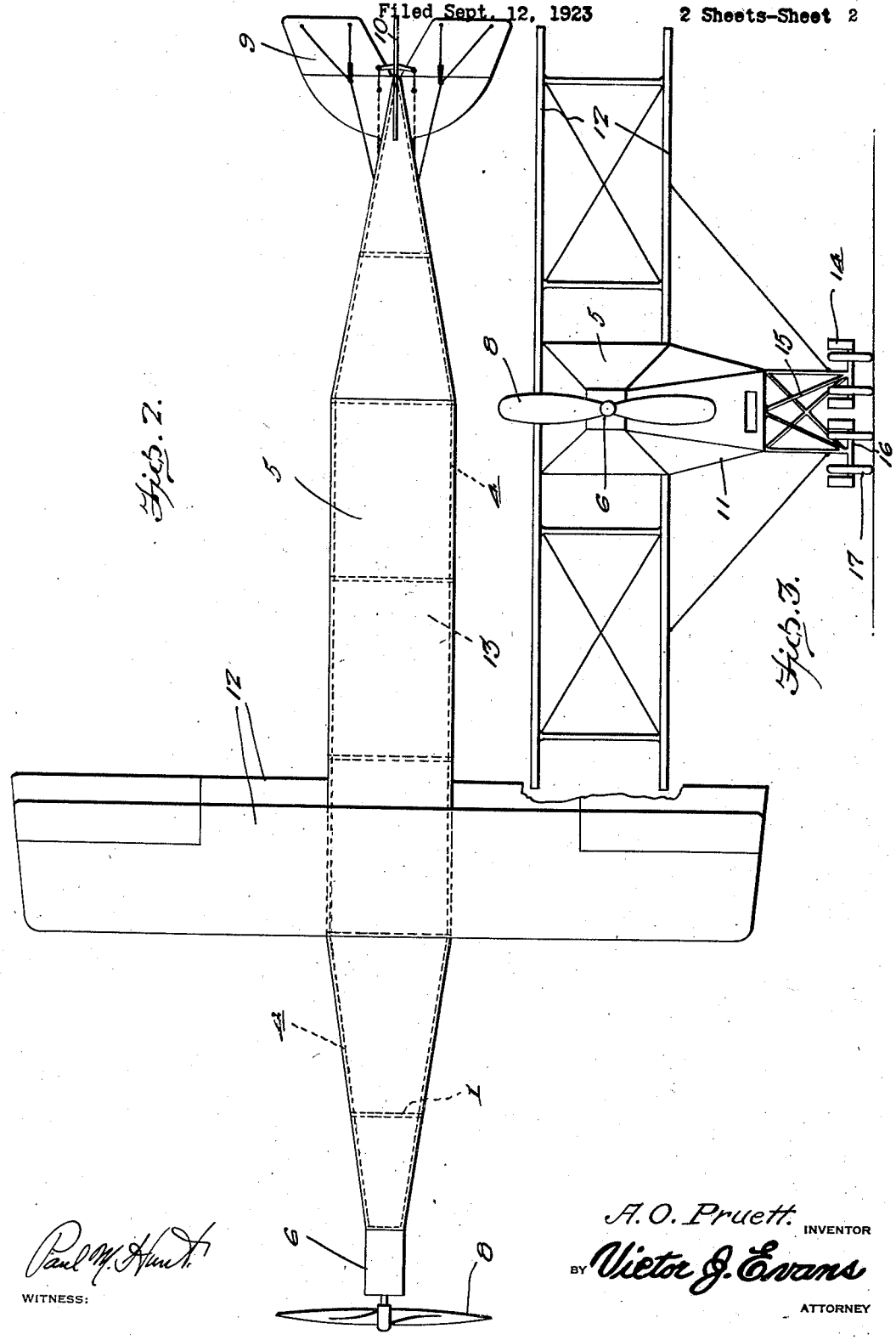

1,555,702

UNITED STATES PATENT OFFICE.

ALBERT O. PRUETT, OF HENRYETTA, OKLAHOMA.

AEROPLANE.

Application filed September 12, 1923. Serial No. 662,341.

*To all whom it may concern:*

Be it known that I, ALBERT O. PRUETT, a citizen of the United States, residing at Henryetta, in the county of Okmulgee and State of Oklahoma, have invented new and useful Improvements in Aeroplanes, of which the following is a specification.

The present invention relates to aircraft and consists in the combination and arrangement of elements hereinafter described and particularly set forth in the appended claim.

The purpose of the invention is to produce a dirigible having its nacelle equipped as an aeroplane in which the advantages of both classes of flying machines are embodied to insure safety in travel either for pleasure or commercial purposes, and also whereby the craft is capable of conveying a greater load than an ordinary aeroplane or dirigible of like size.

Another desirable feature is the construction of an aircraft of air stream lines or of the general form commonly designated as "cigar" shape, in which the upper portion thereof carries a plane and forms a compartment for a gas holder or balloon below which there is arranged the body, while at the nose end there is a tractor propeller and at the tail the usual elevating and guiding rudders, while below the body there are landing gears wheeled to absorb the shock incident to the landing of the machine and likewise to facilitate the ascent thereof, and wherein the construction and association of parts is such as to render practically impossible the capsizing of the craft.

In addition to the foregoing advantages, the invention possess other features of value which will be clearly apparent from the following description when taken in connection with the accompanying drawings.

In the drawings:—

Figure 1 is a side elevation of a flying machine in accordance with this invention.

Figure 2 is a top plan view thereof.

Figure 3 is a front elevation thereof.

Figure 4 is a sectional view approximately on the line 4—4 of Figure 1.

The nacelle or framework of my improved aircraft comprises spaced vertically disposed light metal frames the upper portions of which being substantially rectangular, as indicated by the numeral 1 in Figure 1, and the lower portions of which having their sides inclined inwardly, as at 2, to the straight connecting lower elements therefor. Between the upper and lower portions of each of the frames there is a divisional strut 3 integrally formed with the sides thereof and which divides the framework into upper and lower compartments. By reference to the dotted lines in Figures 1 and 2 of the drawings, it will be seen that the central vertical transverse frames are of the same size and that the end frames gradually decrease in height and width. The transverse frames are connected together by suitable longitudinal elements, indicated by the numeral 4 and disclosed by the dotted lines in Figures 1 and 2 of the drawings. The complete frame of the machine is thus of an airstream line formation, having its ends pointed. The frame or fuselage is covered by plates of light material, as indicated by the numeral 5, the said covering also providing a suitable compartment 6 for a motor at the nose end of the device. The motor operates the shaft of a traction propeller 8. At its rear end there is supported on the craft horizontal or elevating rudders 9 and a guide rudder 10. These rudders are controlled by light wires leading into the lower portion of the frame which forms the body 11 thereof. On the top of the craft, forward of the center of pressure there is a transversely arranged plane 12 which may and preferably has ailerons adjacent to its outer ends.

In the rectangular upper portions of the transverse frames there is arranged an air bag or balloon 13 inflated with a suitable gas, and preferably there is arranged on the strut partitions 3 a covering which provides a ceiling for the body 11 and a bottom for the gas holder or balloon compartment. Of course, suitable means is provided for inflating the balloon.

The body may be divided into any desired number of compartments for passengers or freight as well as into an engine room whereby access to the motor may be readily obtained. The landing gear for the craft comprises runners 14 arranged in spaced relation and connected to the under face of the body 11 by suitable braces 15. Each of the runners 14 has its forward end upwardly inclined and each of the runners has approximately centrally journaled thereon shafts 16 on each of which there is secured a pair of ground wheels 17.

The body 11 of the improvement is provided with suitable windows and doors and is likewise divided into separate compartments or rooms. My improvement may successfully be employed either as a passenger or freight conveyance and as the same is in the nature of a combined dirigible and aeroplane the same is capable of carrying a greater amount of weight than a dirigible or an aeroplane of a like size. The construction of the improvement is such that a substantially vertical ascent and descent may be made. The parts constituting the improvement are so arranged as to stabilize the craft in its flight as well as in its landing and rising so that liability of side tilting or capsizing is reduced to a minimum if not entirely overcome.

Having described the invention, I claim:

In an aircraft, made up of spaced frames of light metal, each comprising a substantially rectangular upper portion and a trapezoidal lower portion arranged in merging relation, longitudinal elements connecting said frames, and the end series of frames gradually decreasing in size with respect to the central series of frames, a body covering said frames and the said frames dividing the said body into upper and lower compartments, a gas holder in the upper compartment, a traction propeller at one end of the body, elevating and guide rudders at the opposite end of the body, a motor for operating the traction propeller, landing gears on the under face of the body, each of which including runners having upwardly rounded forward ends, shafts journaled between the runners, and wheels on said shafts.

In testimony whereof I affix my signature.

ALBERT O. PRUETT.